Aug. 18, 1925.

C. J. HOLSLAG 1,549,874

ELECTRIC ARC WELDING AND CUTTING SYSTEM AND APPARATUS THEREFOR

Filed Dec. 9, 1921    2 Sheets-Sheet 1

INVENTOR
Claude J. Holslag
BY
A. D. T. Libby
ATTORNEY

Aug. 18, 1925.  
C. J. HOLSLAG  
1,549,874  
ELECTRIC ARC WELDING AND CUTTING SYSTEM AND APPARATUS THEREFOR  
Filed Dec. 9, 1921   2 Sheets-Sheet 2

INVENTOR  
Claude J. Holslag  
BY  
A. D. T. Libby  
ATTORNEY

Patented Aug. 18, 1925.

1,549,874

UNITED STATES PATENT OFFICE.

CLAUDE J. HOLSLAG, OF SOUTH ORANGE, NEW JERSEY, ASSIGNOR TO ELECTRIC ARC CUTTING & WELDING COMPANY, OF NEWARK, NEW JERSEY.

ELECTRIC-ARC WELDING AND CUTTING SYSTEM AND APPARATUS THEREFOR.

Application filed December 9, 1921. Serial No. 521,145.

*To all whom it may concern:*

Be it known that I, CLAUDE J. HOLSLAG, a citizen of the United States, residing at South Orange, in the county of Essex, State of New Jersey, have invented certain new and useful Improvements in Electric-Arc Welding and Cutting Systems and Apparatus Therefor, of which the following is a description, reference being had to the accompanying drawing and to the figures of reference marked thereon.

This invention relates to arc cutting and welding systems and to apparatus therefor.

In the art of electric arc welding and cutting, motor generator sets consisting of a D. C. motor and a special welding generator or an A. C. motor and a special welding generator with their attendent switchboards have been utilized, also special alternating current welding transformers as shown in my Patents 1,305,360-1 and 3 issued June 3, 1919, but in certain classes of work there is a demand for a resistor reactor welding system, which in general consists of a suitable resistance, reactance and the attendent apparatus to connect these together into a welding system. This invention is directed to a system and apparatus for supplying this special demand.

In the prior art, there has been employed in systems of the above character both resistors of various types for controlling the current, and reactors for stabilizing the arc. In some instances the reactor is of the open core type in order to permit the current to build up rapidly when the arc is struck, so that an arc may be easily established. The disadvantage of this type of reactor, however, is that it has very little stabilizing effect on the arc. On the other hand a reactor of the closed core type while it stabilizes the arc, prevents the rapid building up of current necessary to easily establish an arc when the electrode is struck on the work in order to start the arc; and when a reactance of the closed core type is used in a welding system, the establishment of an arc is more difficult and its operation much less persistent.

It is an object of this invention to provide a system embodying a reactor which will operate automatically to permit a rapid building up of the current when striking the arc and which will efficiently stabilize the arc and render it unerringly persistent under arc cutting and welding operations.

It is a further object of this invention to provide in a system of the above character a means for providing a relatively high voltage across the arc terminals, should the arc have a tendency to rupture as for example by being blown out, to permit an automatic reestablishment of the arc.

A further object is to provide means which will supplement the action of the reactor to tend to keep the arc established and stabilized and give it the much needed quality of persistence.

A still further object of this invention is to provide means for easily starting the arc even without touching the electrodes together, or if they are touched, but a bad electrical contact be made.

Another object is to provide a compact, unitary and portable apparatus for carrying out these and other objects which will be apparent to one skilled in the art after reading the specification and claims in connection with the accompanying drawing, wherein Figure 1 illustrates diagrammatically one embodiment of my invention;

Figure 5 is a view of the left hand end of Fig. 4; while

Figure 2:
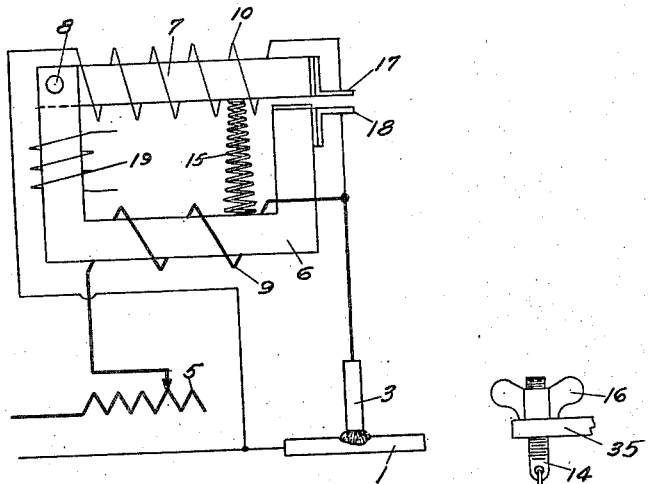
Figure 2 is an arrangement somewhat like that shown in Fig. 1, but with one of the coils carried on the movable armature.

In the drawing 1 indicates a work piece shown in the form of a metal block, the same being connected to the terminal of a source of electric power as by a wire 2. The welding electrode 3 which may be made of any suitable material, is connected through a reactor 4 to the other terminal of the source of current. Also interposed in the line and in series with the reactor, electrode and the work piece, is an ammeter A and an adjustable resistance 5 of low value to prevent a dead short circuit when welding with direct current and when the electrode is in contact with the work piece or "frozen" together.

The reactor in one particular embodiment of my invention described herein has a substantially U-shaped core 6 the legs of which are adapted to be bridged by an armature 7 pivoted to the core as at 8. The core and armature are preferably laminated, and wound about the yoke of the core is a winding 9 connected at one end to the electrode 3 and at its other end to the resistance 5. Inductively linked with this winding is a second winding 10 having a great many turns relative to the winding 9, the ends of this winding being shunted across the arc when the contacts 17 and 18 are substantially closed through leads 11 and 12 and a two-way switch 13, the purpose of which will be hereinafter pointed out. The armature 7 is resiliently held in open magnetic circuit condition by spring 15 attached to a screw 14 carried by piece 35 and an adjusting nut 16.

Under open circuit conditions, the armature 7 of the reactor 4 is tilted so as to leave a relatively large air gap in the magnetic circuit of the reactor. Now when the arc is struck, because of the relatively low reactance of a reactor of the open core type, the current quickly rises to a value sufficient to maintain the arc established between the electrode and the work. The magnetic field created, now pulls the armature 7 so as to bridge the legs of the core to automatically render the reactor into a substantially closed core machine. Any fluctuations of the current in the arc is now strongly opposed by the reactor through the windings thereon so as to stabilize the arc. Should the arc tend to become extinguished, the sudden collapse of the magnetic field of the reactor will induce a current of high potential in the winding 10 sufficient to pierce the gap between the electrode and the work and this will automatically open a path for the current of relatively low operating voltage to follow. Moreover, during operation of the arc, the periodic variations in current to which all arcs are susceptible will constantly cause high voltage discharges to take place across the arc through winding 10 to thereby maintain it in operation. This induced voltage is augmented by the variations in the magnetic field of the reactor caused by the periodic vibrations of the armature 7 vibrating in synchronism with characteristic periodic pulsations of the arc, which thereby periodically increases and decreases the air gap of the reactor.

My observations of the action of this reactor indicate that the flux in the reactor is the net amount resulting from the ampere turns of the series coil less the ampere turns of the shunt coil. Hence the flux and the reactance is controlled by the current through the series coil and the voltage across the shunt coil. The arc has a periodicity of its own irrespective of normal current changes. This pulsation of the arc caused perhaps by pulsation of the metal, makes this reactor work like a transformer in regard to the shunt winding acting as the secondary to inject a steadying voltage across the arc. This action appears to be a true transformer action when the source of power is direct current.

Figure 1:
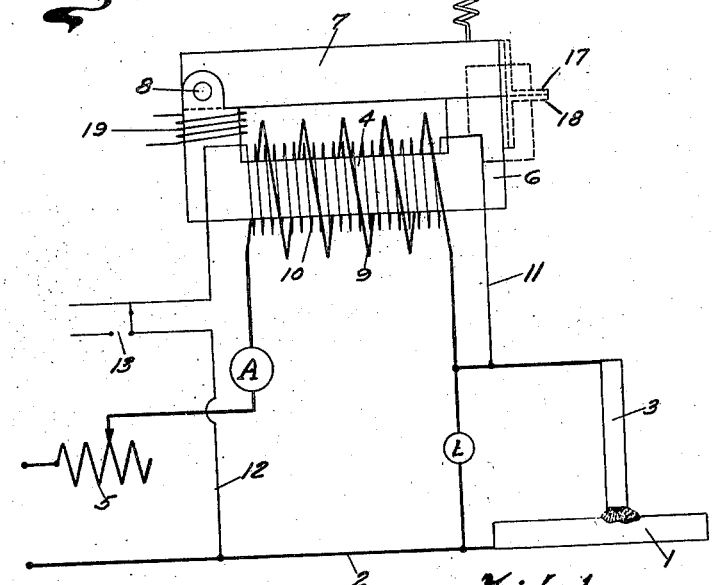

In some cases I may use an additional winding 19 connected to some suitable source of periodic current, either alternating or D. C. interrupted current for the purpose of supplying at will a high voltage current across the arc through the medium of the induced action of the winding 19 on the other windings of the reactor. This voltage may be high enough to even jump the contacts 17 and 18 before they close, or even jump the electrode points before they are actually touched, or even if they are touched and a bad contact is made, a small spark will take place which tends to heat up the electrode points, whereby the main arc is easily established. In Fig. 1 I have shown a lamp L across the arc to absorb inductive kicks and to give some indication of the main open circuit voltage. It is to be understood that the lamp L and the ammeter A may be used in the combination shown in Fig. 2.

Figure 3:
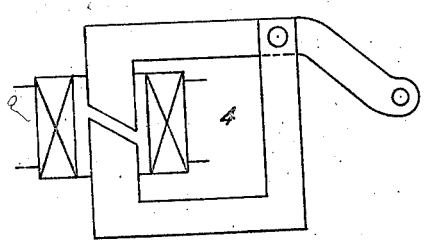
Figure 3 is a diagrammatic view of a reactor-relay which may be used but with certain of the levers and spring contacts removed for the purpose of clearness.

In Fig. 3 the reactor 4 is built into the form of a relay which is shown somewhat diagrammatically, it being understood that the core structure of the relay is built up of thin laminations of magnetic material.

Figure 4:
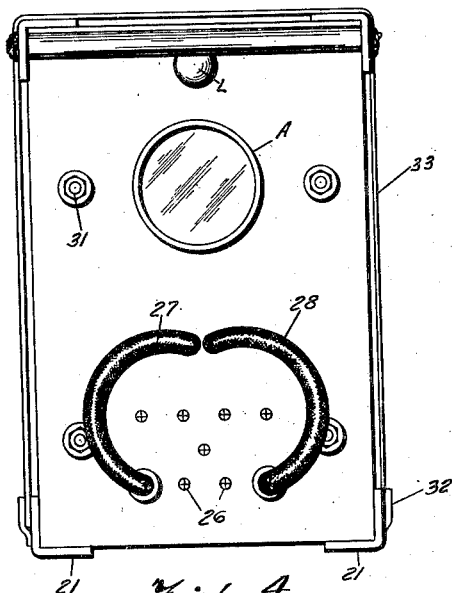
Figure 4 is a side view of the apparatus shown in Fig. 1 all assembled in one unitary, portable structure, but with most of the cover removed in order to show the interior construction, the electrical connections being omitted for the purpose of clearness.
Figure 6:
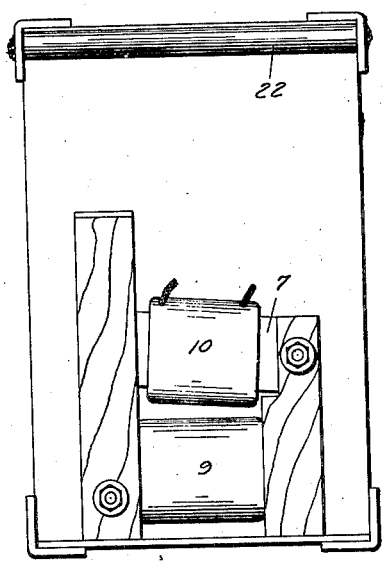
Figure 6 is a view of the right hand end of Fig. 4.
Figure 5:
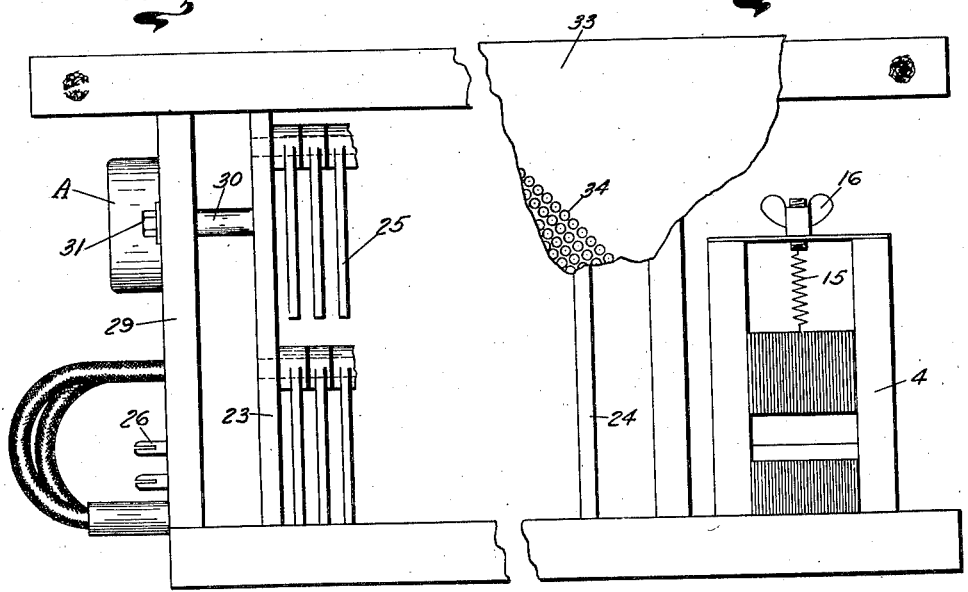

The apparatus shown diagrammatically in Figs. 1, 2 and 3 is combined into a single, unitary, portable structure as shown in Figs. 4, 5 and 6. As shown in these figures there are four side bars 21, preferably in the form of angle irons, the top ones of which are extended and have rods 22 passing therebetween forming handles for carrying the unit. Fastened to the side bars 21 are plates 23 and 24, through which pass bolts that support grids 25 corresponding to the resistance 5. These grids are insulated from the supporting rods and are arranged so that certain portions of them may be connected in multiple and in series with the balance of the grids so that suitable variations in resistance 5 may be obtained through the medium of the terminals 26 and the switch connectors 27 and 28. The terminals 26 are mounted on a suitable switchboard 29 that is preferably fastened to the plate 23 through the medium of studs 30 and bolts 31. The switchboard also carries the ammeter A and the lamp L. Carried on the members 21 on the opposite end thereof from the switchboard 29 is the reactor 4 which has been previously described so that no further description of this is necessary. Passing over the members 21 and engaging hooks 32 on either side of the bottom members is a cover 33 preferably perforated at 34 throughout its entire surface, top and sides, in order to give ventilation to the units mounted within it, when the reactor-relay shown in Fig. 3 is used in place of the reactor of Figs. 1 or 2. This is mounted on the end of the unit in place of the reactor 4.

The two way switch 13 shown in Fig. 1 may be used at will for connecting the winding 10 to a source of alternating current or D. C. interrupted, the same as to winding 19, whereby a high voltage high frequency current is applied across the arc by winding 10. I have shown contacts 17 and 18 in Fig 1 in dotted lines but these may or may not be used in this embodiment of my invention, in fact in cases where the source of power is 110 volts or below, I prefer not to use the said contacts but connect the winding 10 across the arc as shown in full lines. This arrangement with a variable reactor as set forth gives substantially a constant rate of heat at the arc which I believe to be a new feature in a reactor-resistance arc welding system.

From the above it will be seen that I have supplied a system for arc welding and cutting in which unique means are provided for starting the arc and maintaining it after having once established it, and that I have combined this apparatus into a single, unitary portable structure that is light in weight and relatively cheap as compared with the more heavy and elaborate motor generator sets.

While I have shown certain embodiments of my invention it will be readily understood by one skilled in the art that many changes may be made in the details without departing from the spirit of my invention and the scope of the appended claims.

Having thus described my invention what I claim is:

1. In an arc welding and cutting system, a main source of current for the arc and means in non-inductive relation to the main source of current for superimposing an auxiliary current across the arc actuated by changes of the main current.

2. In an arc welding and cutting system, a main source of current for the arc and means for superimposing an auxiliary current of a voltage materially higher than the voltage of said main source, across the arc, by changes of the main current.

3. In an arc welding and cutting system, a main source of current for the arc and means brought into operation by sudden changes in the arc current for impressing across the arc an auxiliary voltage exceedingly higher than the voltage of the arc at such times as the arc tends to go out.

4. In an arc welding and cutting system, a main source of current for the arc and an inductive device in non-inductive relation to the main source of current and actuated by the arc current for superimposing across the arc a current of higher potential voltage than the maximum working voltage of the arc.

5. In an arc welding and cutting system, a main source of current for the arc, an inductive device having two windings, the first in series with the arc and carrying the main current and the second brought into action by the first for impressing an auxiliary high voltage across the arc.

6. In an arc welding and cutting system, a main source of current for the arc, an inductive device having two windings, the first in series with the arc and carrying the arc current and the second normally open circuited at said inductive device but closed across the arc by the flow of the main current through the first winding, said second winding generating a high voltage across the arc resulting from changes in the main arc current for the purpose described.

7. In an arc welding and cutting system, a main source of current for the arc, a reactor in circuit with the arc, said reactor consisting of a core of magnetic material and two windings thereon, one in series and the other in parallel with the arc for the purpose described.

8. In an arc welding and cutting system, a main source of current for the arc, a reactor in circuit with the arc, said reactor consisting of a normally open core of magnetic material and two windings thereon, one in series with the arc current and adapted when the arc electrodes are brought together to close said core, the other winding adapted to generate a high voltage across the arc when the current changes therethrough.

9. In an arc welding and cutting system, a main source of current for the arc, a reactor associated with said arc circuit, said reactor having one winding supplying the main stabilizing effect to the arc and the other winding supplying a guardian voltage to the arc as described.

10. In an arc welding and cutting system, a main source of current for the arc, a winding in series with the arc, a normally open magnetic core embraced by said winding, said core being substantially closed by the action of said winding when the arc electrodes are brought together and being variable in point of closure during the working of the arc.

11. In an arc welding and cutting system, a main source of current for the arc, an inductive winding in series with the arc and said source of current and a second winding in inductive relation to the first winding and connected in multiple with the arc.

12. In an arc welding and cutting system, a main source of current for the arc, an inductive stabilizing winding in series with the arc and said source of current and a second stabilizing winding in inductive relation to the first winding and connected in multiple with the arc.

13. In an arc welding and cutting system, a main source of current for the arc, a stabilizing winding in series with said source of current and the arc and a second stabilizing winding connected across the arc and energized from the first mentioned winding by periodic pulsations of the arc current.

14. In an arc welding and cutting system, a main source of current for the arc, a reactor having a magnetizable core with a winding thereon connected in series with the arc and the source of current and a second winding on a separate part of the core and connected across the arc.

15. In an arc welding and cutting system, a main source of current for the arc, a reactor having a magnetizable core with a portion movable, a winding on the stationary part of the core connected in series with the arc and a second winding on the movable part of the core and adapted to be connected in multiple with the arc.

16. In an arc welding and cutting system, a main source of current for the arc, a reactor having a magnetizable core with a portion movable, said movable portion being held in a position to open the magnetic circuit when the arc is out, a stabilizing winding on one part of the core in series with the arc for the purpose described and a second stabilizing winding on another part of the core, brought into action across the arc on actuation of the movable part of said core.

17. In an arc welding and cutting system, a main source of current for the arc, a resistance and a reactor having a winding adapted to be connected in series with the arc and said resistance and a shunt winding on the reactor adapted to be connected across the arc electrodes.

18. In an arc welding and cutting system, a main source of current for the arc, a reactor having a magnetizable core with a portion movable, a winding on the stationary part of the core, but connected in series with the arc and a second winding on the core and adapted to be connected in multiple with the arc.

19. In an arc welding and cutting system, a main source of current for the arc, a reactor having a magnetizable core with a portion movable, said movable portion being held in a position to open the magnetic circuit when the arc is out, a stabilizing winding on one part of the core in series with the arc for the purpose described and a second stabilizing winding on the core, brought into action across the arc on actuation of the movable part of said core.

20. In an arc welding and cutting system, a main source of current for the arc, a reactor having a magnetic core with a winding on one part thereof connected in series with the arc, a second winding on the core and connected across the arc and a third winding on another portion of the core adapted to generate a high potential across the arc electrodes through the medium of the second winding.

21. In an arc cutting and welding system, a main source of current for the arc, a reactor having a normally open core, a winding on the core in series with the arc electrodes, a second winding on the core connected in shunt to the arc when it is running but operatively open circuited when the arc is out, a third winding on the core for generating a high potential in the second winding sufficient for jumping across the open gap of the second winding and from one electrode to the other just prior to the time of contact of said electrodes.

22. In an arc welding and cutting system, a main source of current for the arc, a resistance and a reactor in circuit with the arc electrodes, said reactor having a movable normally open core and two windings associated therewith, one of said windings adapted to move the core to closed position when the arc electrodes are brought together and the other winding serving to hold the core in closed position and to stabilize the arc while the arc is in operation.

23. In an arc welding and cutting system, a main source of current for the arc, a resistance and a reactor in circuit with the arc electrodes, said reactor having a movable normally open core and two windings associated therewith, one of said windings adapted to move the core to closed position when the arc electrodes are brought together and means for supplying to said winding a potential considerably less than that of the source of supply and the other winding serving to hold the core in closed position and to stabilize the arc while the same is in operation.

24. In an arc welding and cutting system, a main source of current for the arc, a reactor in the arc circuit consisting of a magnetic core having a winding in series with the arc, a second winding in shunt to the arc and a third winding for impressing a high voltage across the arc through said second winding.

25. In an arc welding and cutting system, a main source of current for the arc, a reactor having a main stabilizing winding in series with said arc, a second winding in shunt to the arc for generating a guardian voltage for the arc and a third winding in inductive relation to the second for generating in the second winding a much higher voltage than the arc or guardian voltage, to assist in starting the arc.

26. In an arc welding and cutting system, a main source of current for the arc, means for helping to start the arc consisting of a winding in series with the arc, a winding connected in shunt to the arc and a third winding in inductive relation to the second for impressing on the second a high voltage current for breaking down the resistance at the electrode points.

27. In an arc welding and cutting system, a main source of current for the arc, a reactor having a magnetic core with a winding on one part thereof connected in series with the arc, a second winding on another part of the core and connected across the arc and a third winding on another portion of the core adapted to generate a high potential across the arc electrodes through the medium of the second winding.

28. In an arc welding and cutting system, a main source of current for the arc, a reactor having a normally open core, a winding on the core in series with the arc electrodes, a second winding on the core connected in shunt to the arc when it is running but operatively open circuited by the core when the arc is out, a third winding on the core for generating a high potential in the second winding sufficient for jumping across the open gap of the second winding and from one electrode to the other just prior to the time of contact of said electrodes.

29. In an arc welding and cutting system, a main source of current for the arc, means for raising the temperature of the arc electrode contact points, immediately preceding the act of touching the electrodes, consisting of, a reactor having a winding in series with the arc, a winding in shunt to the arc and a third winding in inductive relation to said shunt winding for inducing therein a current of potential high enough to jump from one electrode to the other before the electrodes are actually brought together.

30. In an arc welding and cutting system, a main source of current for the arc, means for superimposing an auxiliary current across the arc by changes in the main current and further means acting on the first mentioned means for superimposing across the arc electrodes at will a much higher voltage than either the welding arc voltage or the voltage of said auxiliary current.

31. In an arc welding and cutting system, a main source of current for the arc, an inductive device having a winding in series with the arc, a second winding adapted to be connected across the arc electrodes, a third winding, and an auxiliary source of power therefor for causing the second winding to generate a relatively high potential for arc starting purposes.

32. In an arc welding and cutting system, a main source of current for the arc, a reactor having a movable core, a shunt winding on the core and a series winding for holding the core in substantially closed position and allowing the core to open when the arc is lengthened a predetermined amount.

33. In an arc welding and cutting system, a main source of current for the arc, a reactor in the arc circuit having a normally open magnetic core, a low voltage limit winding on the core for closing the same and an arc length controlled winding for holding or opening the core.

34. In an apparatus for use in an arc welding system, a framework having a plurality of bars, end plates tying said bars together, a series of resistance fastened between said plates, a switchboard having switching terminals carried on the frame at one end thereof outside one of said end plates, a reactor carried on the frame outside one of said end plates at the end opposite to said switchboard, and connectors for electrically joining the reactor, resistances and switching terminals.

35. In an apparatus for use in an arc welding system, a framework having four side bars arranged in rectangular form, end plates fastened to and tying said bars together, a series of resistance grids carried on members attached to said end plates, a switchboard having switching terminals carried on said frame at one end thereof outside one of said end plates, a reactor carried on the frame outside one of said end plates at the end opposite to said switchboard and connectors for electrically joining the reactor, resistance grids and switching terminals.

36. In an apparatus for use in an arc welding system, a framework having four side bars arranged in rectangular form, the top bars projecting at both ends and having handle cross members therebetween, end plates fastened to and tying said bars together, rods fastened to said end plates, resistance grids carried on but insulated from said rods, a switchboard having switching terminals carried on said framework outside of, but closely adjacent one of said end plates, a reactor carried on the framework outside of but closely adjacent the other of said plates, and connectors for electrically joining the reactor, resistance grids and switching terminals.

In testimony whereof, I affix my signature.

CLAUDE J. HOLSLAG.